US012499228B2

(12) United States Patent
Li et al.

(10) Patent No.: US 12,499,228 B2
(45) Date of Patent: Dec. 16, 2025

(54) STACKING-ENSEMBLE-BASED APT ORGANIZATION IDENTIFICATION METHOD AND SYSTEM, AND STORAGE MEDIUM

(71) Applicant: GUANGZHOU UNIVERSITY, Guangdong (CN)

(72) Inventors: Shudong Li, Guangzhou (CN); Qianqing Zhang, Guangzhou (CN); Xiaobo Wu, Guangzhou (CN); Weihon Han, Guangzhou (CN); Binxing Fang, Guangzhou (CN); Zhihong Tian, Guangzhou (CN); Lihua Yin, Guangzhou (CN); Zhaoquan Gu, Guangzhou (CN)

(73) Assignee: GUANGZHOU UNIVERSITY, Guangdong (CN)

( * ) Notice: Subject to any disclaimer, the term of this patent is extended or adjusted under 35 U.S.C. 154(b) by 232 days.

(21) Appl. No.: 18/003,318

(22) PCT Filed: Jun. 21, 2021

(86) PCT No.: PCT/CN2021/101276
§ 371 (c)(1),
(2) Date: Dec. 26, 2022

(87) PCT Pub. No.: WO2021/259207
PCT Pub. Date: Dec. 30, 2021

(65) Prior Publication Data
US 2023/0259621 A1     Aug. 17, 2023

(30) Foreign Application Priority Data
Jun. 24, 2020   (CN) .......................... 202010586298.4

(51) Int. Cl.
*G06F 21/56*        (2013.01)

(52) U.S. Cl.
CPC ...... *G06F 21/563* (2013.01); *G06F 2221/033* (2013.01)

(58) Field of Classification Search
CPC ...... G06F 21/56; G06F 21/563; G06F 21/564; G06F 21/00; G06F 21/566
See application file for complete search history.

(56) References Cited

U.S. PATENT DOCUMENTS

| 2015/0096024 | A1  | 4/2015  | Haq |
| 2020/0265119 | A1* | 8/2020  | Desai ................. G06F 18/2135 |
| 2020/0311262 | A1* | 10/2020 | Nguyen ............... G06F 21/554 |

FOREIGN PATENT DOCUMENTS

| CN | 104866765 | 8/2015 |
| CN | 106845229 | 6/2017 |

(Continued)

OTHER PUBLICATIONS

Fu, Yu, et al. "Detecting APT attacks: a survey from the perspective of big data analysis." Journal on Communications 36.11 (2015): 1-14. English Abstract.
"Effective Network Feature Screening Algorithm for APT Samples", Computer Engineering and Applications, 55 (3), Publication Date: Jan. 31, 2018 (Jan. 31, 2018) English Abstract.

*Primary Examiner* — Olugbenga O Idowu
(74) *Attorney, Agent, or Firm* — JMB Davis Ben-David

(57) ABSTRACT

An APT organization identification method, system and storage medium based on a stacking ensemble are provided, the method comprising: using a TF-IDF algorithm combined with an n-gram to extract and vectorize behavior features from malware samples to form a malicious behavior vector feature set; based on the malicious behavior vector feature set, calculating correlations between features and chi-square values between the features and categories, performing screening twice on the malicious behavior vector feature set to obtain an improved low-dimensional feature subset data; constructing a multi-model fusion stacking ensemble, learning an APT organization identification model, using the APT (Continued)

organization identification model to perform an identification on new ATP attacks. The feature selection of high-dimensional behavior vector features reduces the complexity of the data set; the imbalance of samples in the data set is also considered, and multi-model integrated training to improve the recognition accuracy is adopted; in addition, the APT organization identification model for malicious samples is obtained through machine learning training, which improves the automatic identification efficiency of new sample is improved.

9 Claims, 2 Drawing Sheets

(56) References Cited

FOREIGN PATENT DOCUMENTS

| | | |
|---|---|---|
| CN | 107180191 | 9/2017 |
| CN | 108256329 | 7/2018 |
| CN | 108376220 | 8/2018 |
| CN | 108920953 | 11/2018 |
| CN | 110222715 | 9/2019 |
| CN | 110362996 | 10/2019 |
| CN | 110378119 | 10/2019 |
| CN | 110430190 | 11/2019 |
| CN | 111797394 | 10/2020 |

* cited by examiner

STACKING-ENSEMBLE-BASED APT ORGANIZATION IDENTIFICATION METHOD AND SYSTEM, AND STORAGE MEDIUM

CROSS-REFERENCE TO RELATED APPLICATION

This is the U.S. National Stage of International Patent Application No. PCT/CN2021/101276 filed on Jun. 21, 2021, which claims priority to Chinese Patent Application No. 202010586298.4 filed on Jun. 24, 2020.

TECHNICAL FIELD

The invention belongs to the technical field of network security, and in particular relates to an APT organization identification method, system and storage medium based on a stacking ensemble.

TECHNICAL BACKGROUND

Advanced Persistent Threat, APT, is an attack form that uses advanced attack methods to carry out long-term persistent network attacks on specific targets. Different from traditional network attacks, APT attacks have the characteristics of concealment, target, persistence and organization etc. The attack methods are varied. The attack effect is remarkable and difficult to prevent. Cyberattacks carried out by APT organizations usually have political or economic purposes, have a huge impact on countries and enterprises, and pose an increasingly serious threat to various high-level information security systems. Performing organization differentiation of malware samples that implement APT attacks is beneficial to trace real attacking organization entities and to better distinguish and identify specific sources of attack activities. In addition, APT organization identification of malware is a method to detect APT attacks.

APT organization identification methods differ between academia and industry. In academia, the main method relies on similarity analysis of malicious code. For example, Qiao, Yanchen et al. proposed an automatic malware homology identification method based on API calls. The method obtains the API set of malicious samples through static analysis, and then uses the Jaccard similarity coefficient to calculate the homology degree of different malware based on the six calling behaviors defined by programming habits, and establishes a threshold through experience to compare with the homology degree to draw a conclusion of whether the samples are similar. This method may be used to judge the homology between APT samples and determine the organization to which they belong. Hu Zhigiang et al. performed a reverse analysis on malicious sample files to obtain functions of the files, clustering the functions according to the similarity of the functions to obtain a feature set, and set a threshold, and classify malicious sample files whose number of common categories reaches the threshold into one category and mark the same APT organization logo for each type of classified malicious sample files. Chen, W, et al. proposed a new genetic model incorporating knowledge graphs of malware behavior. The method first establishes a genetic model based on node contents, and extracts gene sequences of all malware belonging to each APT organization, then calculates the similarity between the malware and the gene bank, and judges which APT organization the malware belongs to according to similarity scores.

In the industry, the identification of APT organizations is more inclined to the correlation analysis of malicious code structure and its attack chain. For example, FireEye Laboratory analyzed 11 APT advanced persistent attacks in 2013, and found the same code segments, timestamps, digital certificates etc. in the malicious codes used in the attacks, and believed that the attacks were all carried out by the same group. Venustech used shellcode functions and code similarity of some vulnerability samples as the characteristics of correlation analysis, and then traced the source to Hedwig organization.

The above-mentioned industrial analysis techniques are mainly based on manual analysis by relevant security experts, which are greatly influenced by the experience of experts. Secondly, they cannot meet the needs of a large number of samples, with low efficiency and time-consuming. The static API function features that the automatic identification technology in academia relies on will make feature extraction difficult due to the obfuscation and packing techniques of malware. In addition, the current methods mainly rely on known malicious code samples. If variants are identified based only on existing samples, it may lead to inefficient or even ineffective identification.

SUMMARY OF THE INVENTION

The main objective of the present invention is to overcome the shortcomings and deficiencies of the current technology, and to provide an APT organization identification method, system and storage medium based on a stacking ensemble, which may more accurately identify the APT organization to which an APT attack behavior belongs.

In order to achieve the above objective, the present invention adopts the following technical solutions:

The present invention provides an APT organization identification method based on a stacking ensemble, characterized in that, comprising the following steps:

using a TF-IDF algorithm combined with an n-gram to extract and vectorize behavior features from malware samples to form a malicious behavior vector feature set;

based on the malicious behavior vector feature set and an APT organization tag, calculating correlations between features and chi-square values between the features and categories, performing screening twice on the malicious behavior vector feature set to obtain an improved low-dimensional feature subset data;

constructing a multi-model fusion stacking ensemble, learning an APT organization identification model, using the APT organization identification model to perform an organization identification on new ATP attacks.

As a preferred technical solution, using the TF-IDF algorithm combined with the n-gram to extract and vectorize the behavior features from the malware samples to form a behavior data set is specifically:

for behavior text features of the malware samples, first generating n-gram texts, the n-gram may be selected according to actual data, it is recommended to choose n-gram=(1,5), then counting a text frequency TF of each text separately, then attaching a weight parameter IDF to each text;

$$TF_{i,j} = \frac{n_{i,j}}{\sum_k n_{k,j}}$$

wherein $TF_{i,j}$: a frequency of a text i in a sample j; $n_{i,j}$: a number of times the text i appears in the sample j; $\Sigma_k n_{k,j}$: a total number of text appearing in the sample j; then calculating the weight parameters:

$$IDF_{i,j} = \log \frac{|D|}{|j:i \in d_j| + 1}$$

wherein $|D|$ represents a total number of samples, $|j:i \in d_k|$ represents a number of samples containing the text i, in order to prevent a denominator from being zero, 1 is added, a final weight calculation formula of each text is:

$$TF\text{-}IDF_{i,j} = TF_{i,j} \times IDF_{i,j}$$

through a TF-IDF method for calculating malicious sample behavior feature text combined with the n-gram, preprocessing data, calculating text frequency features, performing a feature vectorization on behavior text data to form a semantic matrix, forming the malicious behavior vector feature set.

As a preferred technical solution, feature data extracted by the n-gram combined with a TF-IDF method comprises more feature attributes, first, performing a first primary selection of the malicious behavior vector feature set, calculating correlations between features and features, filtering out features with information redundancy between features.

As a preferred technical solution, calculating the correlations between features and features is specifically:
input: a behavior vector dataset F, a number of features $F_n$, thresholds $\varepsilon_1$, $\varepsilon_2$;
randomly selecting a feature $X_1$, calculating its information entropy $H(X_1)$, if $H(X_1) > \varepsilon_1$ is satisfied, then adding it to a feature set to be selected S, otherwise, continue to select;
for i=2, ..., $F_n$
calculating an information entropy of the feature $X_i$, if $H(X_i) > \varepsilon_1$ is satisfied, then judging correlations between this feature and all other features $X_j$ in S:

$$\rho_{X_i, X_j} = \frac{\text{cov}(X_i, X_j)}{\sigma_{X_i} \sigma_{X_j}} = \frac{E((X_i - \mu_{X_i})(X_j - \mu_{X_j}))}{\sigma_{X_i} \sigma_{X_j}}$$

wherein $\text{cov}(X_i, X_j)$ is a covariance between $X_i$ and $X_j$, $\sigma_{X_i}$ is a variance of $X_i$, $\sigma_{X_j}$ is a variance of $X_j$, $\mu_{X_i}$ is a mean of $X_i$, $\mu_{X_j}$ is a mean of $X_j$, and E is an average value;
if $|\rho_{X_i, X_j}| > \varepsilon_2$, then adding the feature $X_i$ to the feature set to be selected S;
if $|\rho_{X_i, X_j}| > \varepsilon_2$, calculating the information entropy of $X_i$ and $X_j$, if $H(X_j) > H(X_i)$, then replacing the feature $X_i$ with $X_j$ in S;
outputting feature subset S.

As a preferred technical solution, in a process of calculating the correlations between features and features, each feature selected in the feature subset S has more information, and maintaining a low correlation between all features, values of $\varepsilon_1$ and $\varepsilon_2$ need to be adjusted according to experimental effects by adjusting parameters, and need to satisfy:

$$\varepsilon_1 < \frac{1}{n} \sum_{X_i \in D} H(X_i), \varepsilon_2 > \frac{1}{n^2} \sum_{X_i, X_j \in D} \rho(X_i, X_j)$$

then, on the obtained feature subset S, further using a chi-square test to evaluate correlations between the features and category labels, and selecting top N features in each category with the chi-square values.

As a preferred technical solution, calculating the chi-square values between the features and the categories is specifically:
for $S_m$ categories in a feature subset S, calculating a chi-square value of each feature in each category, and arranging the features in a descending order of the chi-square values;
from feature sets of each category, selecting top N feature text and putting them into a new feature subset S';
keeping one of the repeated features in S', and deleting the rest;
outputting the new feature subset S', and the algorithm ends.

As a preferred technical solution, constructing the multi-model fusion stacking ensemble, learning the APT organization identification model is specifically:
based on a new feature subset S' after a feature selection and a corresponding labeled APT organization data as an original data set, a stacking ensemble classification model first divides the original data set into several data sets, which are input to each basic learner of a first-layer prediction model, each base learner outputs its prediction result; wherein the base learner selects a classification algorithm that has a good classification effect on unbalanced data, namely a support vector machine, a random forest, an Adaboost algorithm, then output data of a first layer is used as input data of a second layer, performing a training on a meta-learner of the second layer, and outputting a final prediction result by a model of the second layer, wherein a XGBoost algorithm is used as the meta-learner.

As a preferred technical solution, a specific training method of the stacking ensemble learning is: for a data set $D = \{(x_n, y_n), n=1, \ldots, N\}$, wherein $x_n$ is a feature vector of a n-th sample, $y_n$ is a predicted value corresponding to the n-th sample, m is a number of features included, that is, each feature vector is $(x_1, x_2, \ldots, x_m)$; randomly dividing data into K equal-sized subsets $D_1, D_2, \ldots, D_k$; wherein $D' = D - D_k$, D' and $D_k$ are a training set and a test set in a k-fold cross-validation respectively, the training set D' obtains models $M_{SVM}$, $M_{RF}$, $M_{Ada}$ through three basic learners of the first layer; for each sample $x_n$ in the test set $D_k$, a basic learning prediction for it is represented as $T_{kn}$; after completing a cross-validation process, output data of the three basic learners constitutes a new data sample $D_{new} = \{(y_n, T_{k1}, \ldots, T_{kn}), n=1, \ldots, N\}$; using the data set $D_{new}$ generated by the basic learners as the input data of the second layer of a stacking, then obtaining a model $M_{Xgb}$ by training the XGBoost algorithm of the second layer.

The present invention further provides an APT organization identification system based on a stacking ensemble, comprising a feature extraction module, a feature screening module, and an identification module;
the feature extraction module is used to use a TF-IDF algorithm combined with an n-gram to extract and vectorize behavior features from malware samples to form a malicious behavior vector feature set;
the feature screening module is used, based on the malicious behavior vector feature set, to calculate correlations between features and chi-square values between the features and categories, performing screening twice on the malicious behavior vector feature set to obtain an improved low-dimensional feature subset data;

the identification module is used to construct a multi-model fusion stacking ensemble, learn an APT organization identification model, using the APT organization identification model to perform an organization identification on new ATP attacks.

The present invention further provides a storage medium storing a program, when the program is executed by a processor, the APT organization identification method based on a stacking ensemble is implemented.

Compared with the current technology, the present invention has the following advantages and beneficial effects:

(1) The present invention obtains behavior data of malware based on dynamic analysis and uses a TF-IDF algorithm combined with n-gram to extract and vectorize behavior features from malware samples, which may effectively deal with certain transformation techniques, such as obfuscation and packing etc., which improves the effectiveness of extracting the required feature data.

(2) In the present invention, the feature selection of high-dimensional behavior vector features reduces the complexity of the data set; the imbalance of samples in the data set is also considered, and multi-model integrated training to improve the recognition accuracy is adopted; in addition, the APT organization identification model for malicious samples in this patent is obtained through machine learning training, which improves the automatic identification efficiency of new samples.

(3) The present invention may find the organization to which an APT attack belongs based on an APT organization identification model, which is beneficial to trace the real attacking organization entity, and better distinguish and identify attack activities of specific sources.

DETAILED DESCRIPTION

The present invention will be described in further detail below with reference to the embodiments and the accompanying figures, but the embodiments of the present invention are not limited thereto.

Embodiments

Figure 1:
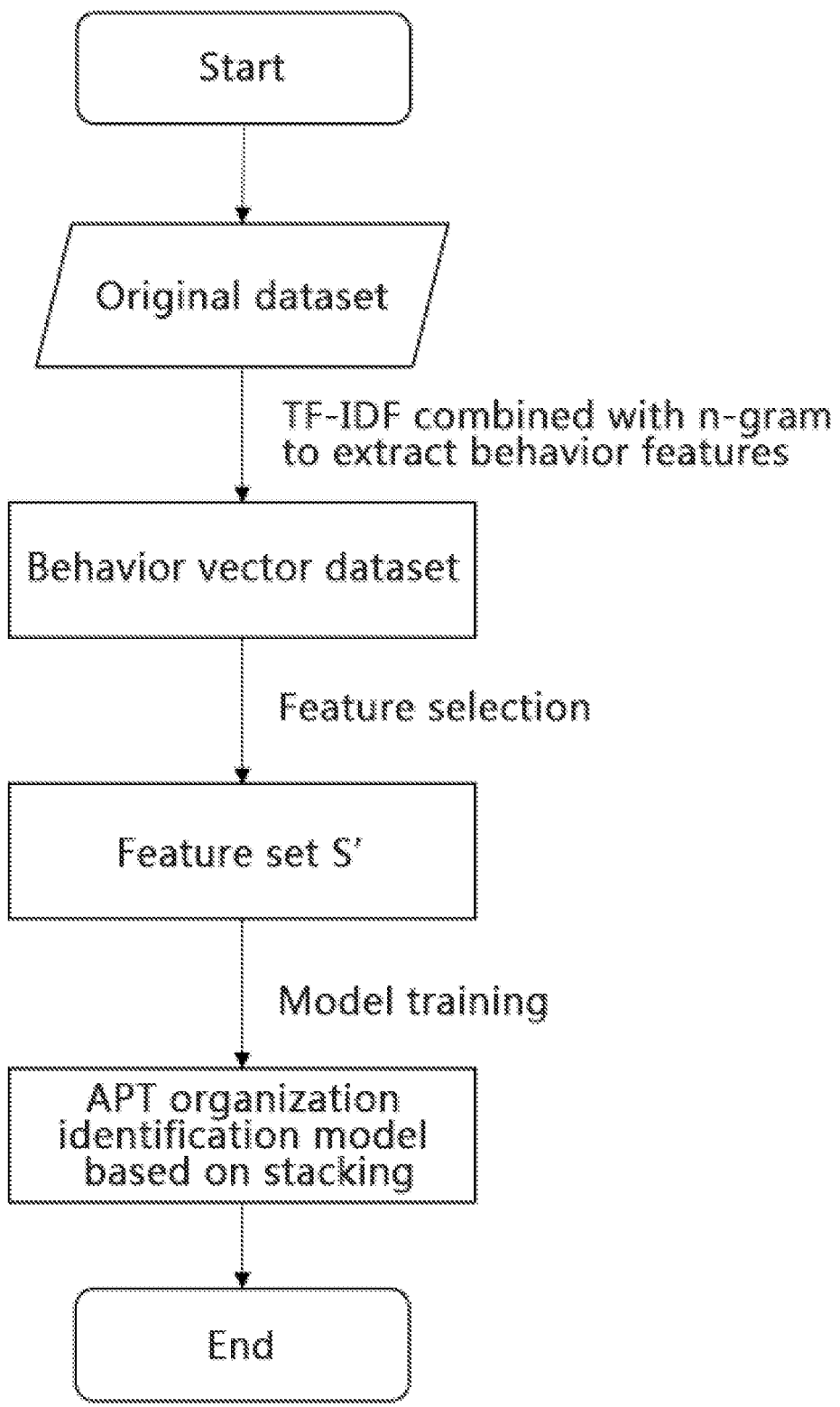
FIG. 1 is a flow chart of an APT organization identification method based on a stacking ensemble of the present invention.

As shown in FIG. 1, an APT organization identification method based on a stacking ensemble of this embodiment, comprising the following steps:

S1: using a TF-IDF algorithm combined with an n-gram to extract and vectorize behavior features from malware samples, the n-gram may be selected according to actual data, it is recommended to choose n-gram=(1.5), to form a malicious behavior vector feature set;

counting a text frequency (TF) of each text for the behavior text features of malicious samples, then attaching a weight parameter (IDF) to it.

$$TF_{i,j} = \frac{n_{i,j}}{\sum_k n_{i,k}}$$

wherein $TF_{i,j}$: a frequency of a text i in a sample j; $n_{i,j}$: a number of times the text i appears in the sample j; $\Sigma_k n_{k,j}$: a total number of text appearing in the sample j. Then calculating the weight:

$$IDF_{i,j} = \log \frac{|D|}{|j:t_i \in d_j| + 1}$$

wherein $|D|$ represents a total number of samples, $|j:i \in d_j|$ represents a number of samples containing the text i, in order to prevent a denominator from being zero, 1 is added, a final weight calculation formula of each text is:

$$TF\text{-}IDF_{i,j} = TF_{i,j} \times IDF_{i,j}$$

through a TF-IDF method for calculating malicious sample behavior feature text combined with the n-gram, preprocessing data, calculating text frequency features, performing a feature vectorization on behavior text data to form a semantic matrix, forming the malicious behavior vector feature set.

S2: based on the malicious behavior vector feature set, calculating correlations between features and chi-square values between the features and categories, performing screening twice on the malicious behavior vector feature set to obtain an improved low-dimensional feature subset data;

Since feature data extracted by the n-gram method in step S1 comprises more feature attributes, it is necessary to, first, perform a first primary selection of the feature set, calculate correlations between features and features, filter out features with information redundancy between features.

Further, in this embodiment, calculating the correlations between features and features is specifically an algorithm that is:

input: a behavior vector dataset F, a number of features $F_n$, thresholds $\varepsilon_1, \varepsilon_2$.

output: feature subset S (1) Randomly selecting a feature $X_1$, calculating its information entropy $H(X_1)$, if $H(X_1) > \varepsilon_1$ is satisfied, then adding it to a feature set to be selected S. Otherwise, continue to select.

(2) For i=2, ..., $F_n$ (3) Calculating an information entropy of the feature $X_i$, if $H(X_i) > \varepsilon_1$ is satisfied, then judging correlations between this feature and all other features $X_j$ in $$S: \rho_{X_i, X_j} = \frac{\text{cov}(X_i, X_j)}{\sigma_{X_i} \sigma_{X_j}} = \frac{E((X_i - \mu_{X_i})(X_j - \mu_{X_j}))}{\sigma_{X_i} \sigma_{X_j}},$$

wherein $\text{cov}(X_i, X_j)$ is a covariance between $X_i$ and $X_j$, $\sigma_{X_i}$ is a variance of $X_i$, $\sigma_{X_j}$ is a mean of $X_j$, $\mu_{X_i}$ is a mean of $X_i$, and E is an average value.

(4) If $|\rho_{X_i, X_j}| < \varepsilon_2$, then adding the feature $X_i$ to the feature set to be selected S. If $|\rho_{X_i, X_j}| > \varepsilon_2$, calculating the information entropy of $X_i$ and $X_j$, if $H(X_j) > H(X_i)$, then replacing the feature $X_i$ with $X_j$ in S.

(5) Outputting the feature subset S.

Further, in the above feature selection process based on correlation, each feature selected in the feature subset S has more information, and maintains a low correlation between all features. Values of $\varepsilon_1$ and $\varepsilon_2$ need to be adjusted according to experimental effects by adjusting parameters, and need to satisfy:

$$\varepsilon_1 < \frac{1}{n}\sum_{X_i \in D} H(X_i), \varepsilon_2 > \frac{1}{n^2}\sum_{X_i, X_j \in D} \rho(X_i, X_j)$$

then, on the obtained simplified feature subset S, further using a chi-square test to evaluate correlations between the features and category labels, and selecting top N features in each category with the chi-square values.

In the present embodiment, the feature primary selection algorithm based on a chi-square test:

Input: feature subset S, number of categories $S_m$, feature selection dimension N Output: new feature subset S'

(1) for $S_m$ categories in a feature subset S, calculating a chi-square value of each feature in each category, and arranging the features in a descending order of the chi-square values.

a) from feature sets of each category, selecting top N feature text and putting them into a feature subset S';
b) keeping one of the repeated features in S', and deleting the rest;
c) outputting the new feature subset S', and the algorithm ends.

In the feature selection part of the method of this embodiment, firstly, the non-redundant features containing the most information are selected by using the information entropy and the correlation degree, then the chi-square test is further used to select the feature subset with high correlation with the category, which realizes a reduction of data dimension through a feature selection, and a better effective feature set is obtained at the same time.

S3. constructing a multi-model fusion stacking ensemble, learning an APT organization identification model, using the APT organization identification model to perform an organization identification on new ATP attacks.

Figure 2:
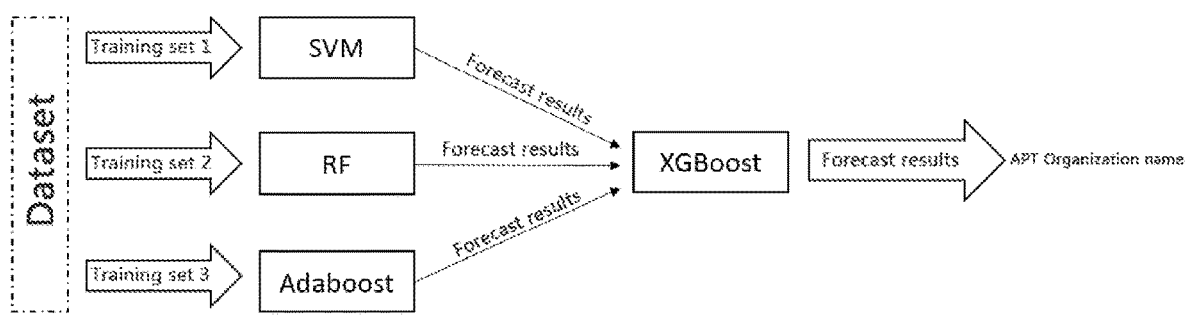
FIG. 2 is a model integration diagram of stacking of the present invention.

As shown in FIG. 2, this embodiment is based on the feature subset S' after a feature selection and a corresponding labeled APT organization data as an original data set, a stacking ensemble classification model first divides the original data set into several data sets, which are input to each basic learner of a first-layer prediction model, each base learner outputs its prediction result. Wherein the base learner selects a classification algorithm that has a good classification effect on unbalanced data, namely a support vector machine, a random forest, an Adaboost algorithm, then output data of a first layer is used as input data of a second layer, performing a training on a meta-learner of the second layer, and outputting a final prediction result by a model of the second layer, wherein a XGBoost algorithm is used as the meta-learner.

Further, a specific training method of the stacking ensemble learning is: for a data set D={$(x_n, y_n)$, n=1, . . . , N}, wherein $x_n$ is a feature vector of a n-th sample, $y_n$ is a predicted value corresponding to the n-th sample, m is a number of features included, that is, each feature vector is $(x_1, x_2, \ldots, x_m)$. Randomly dividing data into K equal-sized subsets $D_1, D_2, \ldots, D_k$. Wherein $D'=D-D_k$, D' and $D_k$ are a training set and a test set in a k-fold cross-validation respectively, the training set D' obtains models $M_{SVM}$, $M_{RF}$, $M_{Ada}$ through three basic learners of the first layer. For each sample $x_n$ in the test set $D_k$, a basic learning prediction for it is represented as $T_{kn}$. After completing a cross-validation process, output data of the three basic learners constitutes a new data sample $D_{new}$={$(y_n, T_{k1}, \ldots, T_{kn})$, n=1, . . . , N}. Using the data set $D_{new}$ generated by the basic learners as the input data of the second layer of a stacking, then obtaining a model $M_{Xgb}$ by training the XGBoost algorithm of the second layer.

In another embodiment, there is provided an APT organization identification system based on a stacking ensemble, the system comprises a feature extraction module, a feature screening module and an identification module;

the feature extraction module is used to use a TF-IDF algorithm combined with an n-gram to extract and vectorize behavior features from malware samples to form a malicious behavior vector feature set;

the feature screening module is used, based on the malicious behavior vector feature set, to calculate correlations between features and chi-square values between the features and categories, performing screening twice on the malicious behavior vector feature set to obtain an improved low-dimensional feature subset data;

the identification module is used to construct a multi-model fusion stacking ensemble, learn an APT organization identification model, using the APT organization identification model to perform an identification on new ATP attacks.

It should be noted here that the system provided by the above-mentioned embodiments is only illustrated by the division of the above-mentioned functional modules. In practical applications, the above functions may be assigned to different functional modules according to the needs, that is, the internal structure is divided into different functional modules to complete all or part of the functions described above. In addition, the algorithms used in the stacking ensemble are not limited to the few algorithms in the example.

In another embodiment of the present application, a storage medium is also provided. The storage is with a program. When the program is executed by a processor, the APT organization identification method based on a stacking ensemble is specifically:

using a TF-IDF algorithm combined with an n-gram to extract and vectorize behavior features from malware samples to form a malicious behavior vector feature set;

based on the malicious behavior vector feature set and, calculating correlations between features and chi-square values between the features and categories, performing screening twice on the malicious behavior vector feature set to obtain an improved low-dimensional feature subset data;

constructing a multi-model fusion stacking ensemble, learning an APT organization identification model, using the APT organization identification model to perform an identification on new ATP attacks.

It should be understood that various parts of this application may be implemented in hardware, software, firmware, or a combination thereof. In the above-described embodiments, various steps or methods may be implemented in software or firmware stored in memory and executed by a suitable instruction execution system. For example, if implemented in hardware, as in another embodiment, it may be implemented by any one or a combination of the following techniques known in the art: discrete logic circuits with logic gates for implementing logic functions on data signals, application specific integrated circuits with suitable combinational logic gates, Programmable Gate Arrays (PGA), Field Programmable Gate Arrays (FPGA) etc.

The above-mentioned embodiments are preferred embodiments of the present invention, but the embodiments of the present invention are not limited by the above-mentioned embodiments, and any other changes, modifications, substitutions, combinations, simplification should be equivalent replacement manners, which are all included in the protection scope of the present invention

The invention claimed is:

1. An APT organization identification method based on a stacking ensemble, comprising the following steps:
   using a TF-IDF algorithm combined with an n-gram to extract and vectorize behavior features from malware samples to form a malicious behavior vector feature set;
   based on the malicious behavior vector feature set and an APT organization tag, calculating correlations between features and chi-square values between the features and categories, performing screening twice on the malicious behavior vector feature set to obtain an improved low-dimensional feature subset data; and
   constructing a multi-model fusion stacking ensemble, learning an APT organization identification model, using the APT organization identification model to perform an organization identification on new APT attacks;
   wherein calculating of the chi-square values between the features and the categories comprises:
   for $S_m$, categories in a feature subset S, calculating a chi-square value of each feature in each category, and arranging the features in a descending order of the chi-square values;
   from feature sets of each category, selecting top N feature text and put them into a new feature subset S';
   keeping one of the repeated features in S', and deleting the rest; and
   outputting the new feature subset S'.

2. The APT organization identification method based on a stacking ensemble according to claim 1, wherein using the TF-IDF algorithm combined with the n-gram to extract and vectorize the behavior features from the malware samples to form a behavior data set comprises:
   for behavior text features of the malware samples, first generating n-gram texts, then counting a text frequency TF of each text separately, then attaching a weight parameter IDF to each text;

$$TF_{i,j} = \frac{n_{i,j}}{\sum_k n_{k,j}}$$

wherein $TF_{i,j}$: a frequency of a text i in a sample j; $n_{i,j}$: a number of times the text i appears in the sample j; $\Sigma_k n_{k,j}$: a total number of text appearing in the sample j; then calculating the weight parameters:

$$IDF_{i,j} = \log \frac{|D|}{|j:i \in d_j| + 1}$$

wherein $|D|$ represents a total number of samples, $|j:i \in d_j|$ represents a number of samples containing the text i, in order to prevent a denominator from being zero, 1 is added, a final weight calculation formula of each text is:

$$TF\text{-}IDF_{i,j} = TF_{i,j} \times IDF_{i,j}$$

and through a TF-IDF method for calculating malicious sample behavior feature text combined with the n-gram, preprocessing data, calculating text frequency features, performing a feature vectorization on behavior text data to form a semantic matrix, forming the malicious behavior vector feature set.

3. The APT organization identification method based on a stacking ensemble according to claim 1, wherein feature data extracted by the n-gram combined with a TF-IDF method comprises more feature attributes, first, performing a first primary selection of the malicious behavior vector feature set, calculating correlations between features and features, and filtering out features with information redundancy between features.

4. The APT organization identification method based on a stacking ensemble according to claim 3, wherein calculating the correlations between features and features comprises:
   inputting: a behavior vector dataset F, a number of features $F_n$, and thresholds $\varepsilon_1, \varepsilon_2$;
   randomly selecting a feature $X_1$, calculating its information entropy H $(X_1)$, if $H(X_1) > \varepsilon_1$ is satisfied, then adding it to a feature set to be selected S, otherwise, continue to select;
   for i=2, ..., $F_n$
   calculating an information entropy of the feature $X_i$, if $H(X_i) > \varepsilon_1$ is satisfied, then judging correlations between this feature and all other features $X_j$ in S:

$$\rho_{X_i, X_j} = \frac{\text{cov}(X_i, X_j)}{\sigma_{X_i} \sigma_{X_j}} = \frac{E((X_i - \mu_{x_i})(X_j - \mu_{x_j}))}{\sigma_{X_i} \sigma_{X_j}}$$

wherein $\text{cov}(X_i, X_j)$ is a covariance between $X_i$ and $X_j$, $\sigma_{x_i}$ is a variance of $X_i$, $\sigma_{x_j}$ is a variance of $X_j$, $\mu_{x_i}$ is a mean of $X_i$, $\mu_{x_j}$ is a mean of $X_j$, and E is an average value;
   if $|\rho_{X_i, X_j}| < \varepsilon_2$, then add the feature X to the feature set to be selected S;
   if $|\rho_{X_i, X_j}| > 22$, calculating the information entropy of $X_i$ and $X_j$, if H $(X_j) >$ H $(X_i)$, then replacing the feature $X_i$ with $X_j$ in S;
   and outputting feature subset S.

5. The APT organization identification method based on a stacking ensemble according to claim 4, wherein in a process of calculating the correlations between features and features, each feature selected in the feature subset S has more information, and maintaining a low correlation between all features, values of $\varepsilon_1$ and $\varepsilon_2$ need to be adjusted according to experimental effects by adjusting parameters, and need to satisfy:

$$\varepsilon_1 < \frac{1}{n} \sum_{X_i \in D} H(X_i), \varepsilon_2 > \frac{1}{n^2} \sum_{X_i, X_j \in D} \rho(X_i, X_j)$$

then, on the obtained feature subset S, further using a chi-square test to evaluate correlations between the features and category labels, and selecting top N features in each category with the chi-square values.

6. The APT organization identification method based on a stacking ensemble according to claim 1, wherein constructing the multi-model fusion stacking ensemble, learning the APT organization identification model comprises:
   based on a new feature subset S' after a feature selection and a corresponding labeled APT organization data as an original data set, a stacking ensemble classification model first divides the original data set into several data sets, which are input to each basic learner of a first-layer prediction model, each base learner outputs its own prediction result; wherein the base learner selects a classification algorithm that has a good classification effect on unbalanced data, namely a support vector machine, a random forest, an Adaboost algorithm, then output data of a first layer is used as input data of a second layer, performing a training on a meta-learner of the second layer, and outputting a final prediction result by a model of the second layer, wherein an XGBoost algorithm is used as the meta-learner.

7. The APT organization identification method based on a stacking ensemble according to claim 6, wherein a training method of the stacking ensemble learning comprises: for a data set D={$(x_n, y_n)$, n=1, ..., N}, wherein $x_n$ is a feature vector of a n-th sample, $y_n$ is a predicted value corresponding to the n-th sample, m is a number of features included, that is, each feature vector is $(x_1, x_2, ..., x_m)$; randomly dividing data into K equal-sized subsets $D_1, D_2, ..., D_k$; wherein $D'=D-D_k$, $D'$ and $D_k$ are a training set and a test set in ak-fold cross-validation respectively, the training set $D'$ obtains models $M_{SVM}$, $M_{RF}$, $M_{Ada}$ through three basic learners of the first layer; for each sample $x_n$ in the test set $D_k$, a basic learning prediction for it is represented as $T_{kn}$; after completing a cross-validation process, output data of the three basic learners constitute a new data sample $D_{new}=\{(y_n, T_{k1}, ..., T_{kn}), n=1, ..., N\}$; using the data set $D_{new}$ generated by the basic learners as the input data of the second layer of a stacking, then obtaining a model $M_{Xgb}$ by training the XGBoost algorithm of the second layer.

8. An APT organization identification system based on a stacking ensemble, comprising a feature extraction module, a feature screening module and an identification module;

wherein the feature extraction module is configured to use a TF-IDF algorithm combined with an n-gram to extract and vectorize behavior features from malware samples to form a malicious behavior vector feature set;

wherein the feature screening module is configured, based on the malicious behavior vector feature set, to;

calculate correlations between features;

calculate chi-square values between the features and categories by:
- for $S_m$ categories in a feature subset S, calculating a chi-square value of each feature in each category, and arranging the features in a descending order of the chi-square values;
- from feature sets of each category, selecting top N feature text and put them into a new feature subset S';
- keeping one of the repeated features in S', and deleting the rest; and
- outputting the new feature subset S'; and perform screening twice on the malicious behavior vector feature set to obtain an improved low-dimensional feature subset data; and wherein the identification module is configured to construct a multi-model fusion stacking ensemble, learn an APT organization identification model, using the APT organization identification model to perform an identification on new APT attacks.

9. A non-transitory storage medium storing a program, wherein when the program is executed by a processor, the APT organization identification method based on a stacking ensemble according to claim 1 is implemented.

* * * * *